Figure 1:
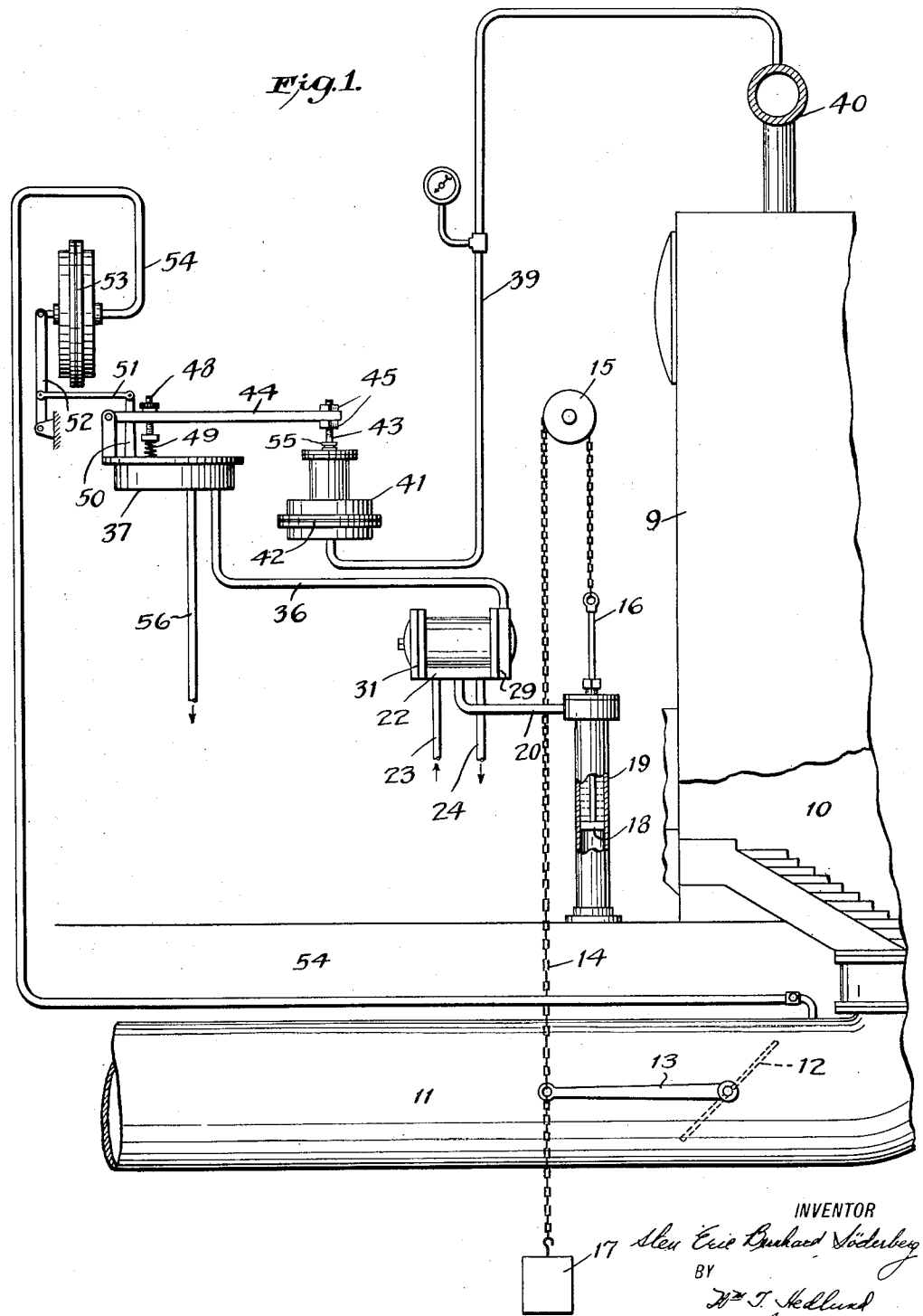

Feb. 8, 1927.

S. E. B. SÖDERBERG 1,616,557

REGULATION

Filed July 10, 1925    2 Sheets-Sheet 1

INVENTOR
Sten Eric Burkard Söderberg
BY
Wm J. Hedlund
his ATTORNEY

Feb. 8, 1927. 1,616,557
S. E. B. SÖDERBERG
REGULATION
Filed July 10, 1925   2 Sheets-Sheet 2

INVENTOR
Sten Eric Bernhard Söderberg
BY
Wm. J. Hedlund
his ATTORNEY

Patented Feb. 8, 1927.

1,616,557

UNITED STATES PATENT OFFICE.

STEN ERIC BERNHARD SÖDERBERG, OF NEW YORK, N. Y., ASSIGNOR TO ARCA REGULATORS, INC., OF NEW YORK, N. Y., A CORPORATION OF VIRGINIA.

REGULATION.

Application filed July 10, 1925. Serial No. 42,653.

My invention relates to compensation or return motion for regulators and comprises a regulator operated by one fluid with means to compensate in response to pressure in a second fluid controlled by the first.

The object of my invention is to produce a regulation free from all of the disadvantages of hunting and which will maintain a constant condition in that which is to be controlled.

A further object of my invention is to provide a novel combined control responsive to a plurality of controlling agencies.

A still further object of my invention is to produce a regulator for controlling the draft in a boiler furnace or pressure under grates in accordance with steam pressure and compensating the control in accordance with variations in pressure of the air supplied for combustion.

Other purposes of my invention will be apparent as the description proceeds which is to be taken in connection with the accompanying drawings in which like reference characters denote like parts.

Figure 2:
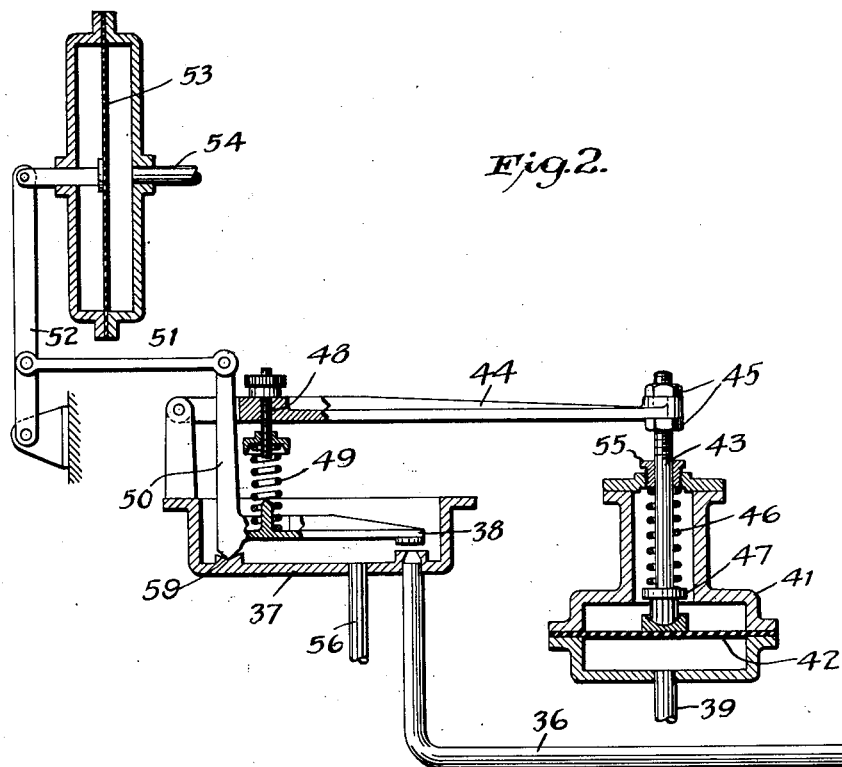
Figure 3:
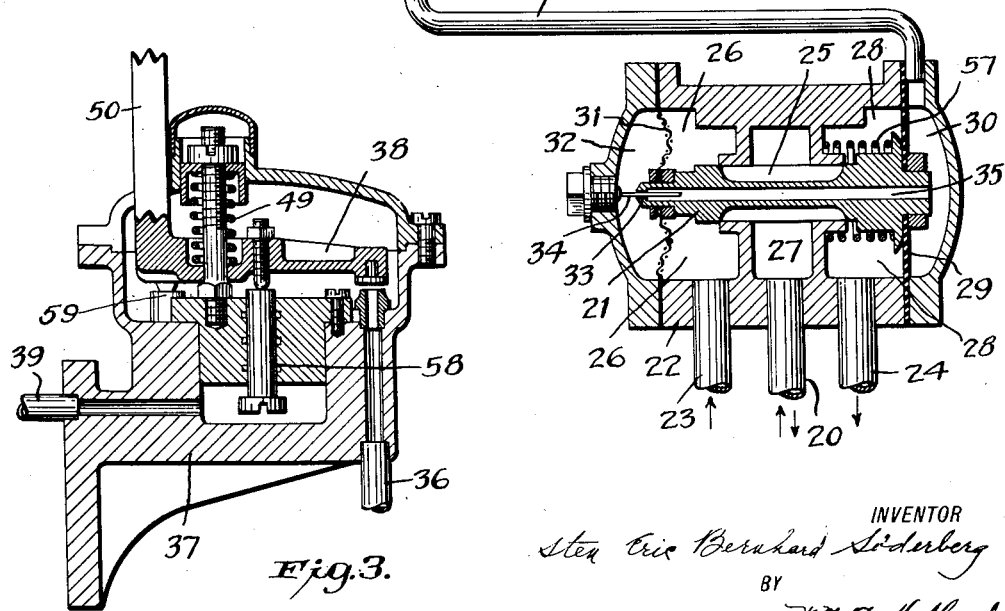

In the accompanying drawings Figure 1 is a general layout of the parts of one form of regulator and controlling parts in accordance with my invention; Figure 2 is a cross section through certain parts shown in Figure 1; and Figure 3 is a modified form of part of the apparatus used in my control system.

With reference to Figures 1 and 2, 10 designates the combustion chamber of a boiler which boiler may be of any type and may be fired in any desired manner. Air is supplied to combustion chamber 10 through air duct 11, the flow through which is controlled by a damper 12, operated by lever 13. Lever 13 is attached to a chain 14 which passes over pulley 15 and at one end is connected to piston rod 16 and, at the other end, carries a counterweight 17. Piston rod 16 is connected to piston 18 moving in cylinder 19, which has liquid within the same acting upon piston 18. The parts 14, 15, 16, 17, 18 and 19 constitute what may be termed a liquid pressure operated servomotor.

Passage of liquid into and out of servomotor cylinder 19 takes place through conduit 20 and is controlled by a pilot valve 21 situated in pilot valve housing 22. The pilot valve upon movement controls communication between the servo-motor cylinder and a supply conduit 23, for liquid under pressure, or a waste conduit 24.

Pilot valve 21 is a cylindrically formed slide valve with grooves 25 cut into same and arranged so that upon movement of the pilot valve to the left from the neutral position shown in Figure 2, communication is established between chamber 26 to which conduit 23 is connected and chamber 27 which has connection with conduit 20; whereas, upon movement of the slide valve to the right from the neutral position shown in Figure 2, communication is established between chamber 27 and chamber 28, which communicates with waste conduit 24. Attached to one end of the pilot valve is a movable diaphragm 29. This diaphragm 29 forms one side of a chamber 30 to which liquid is supplied from chamber 26 through the filter 31, through chamber 32, through a narrow passage 33, and through the longitudinal passageway 35 which is formed within the pilot valve. Changes of pressure (caused in a manner presently to be described) in chamber 30 give movement to diaphragm 29 whereby pilot valve 21 is moved. Extending through narrow passage 33 is a pin 34 which serves to clean the passage. This pin, which is secured to the stationary pilot valve housing, has a reciprocating action with respect to the narrow passage upon movement of pilot valve 21 whereby clogging of the said passage by particles of dirt or growth is prevented.

From chamber 30 liquid passes through conduit 36 and sprays into relay housing 37 against a lever 28, pivoted at 59, movement of which, by checking the outflow through conduit 36, causes pressure changes in chamber 30, which move the pilot valve.

The construction of the pilot valve and servo-motor is not new as regards my present invention, but is merely used to show one means whereby my invention can be accomplished. For full description of the parts hereinbefore described reference may be had by referring to the co-pending application of Ragnar Carlstedt, Ser. No. 719,022.

The continuously flowing stream of liquid entering relay housing 37 is controlled both in accordance with steam pressure and in accordance with air pressure. Steam pressure acts through tube 39 connected with steam main 40 which may be the steam main receiving steam from the boiler 9 of which 10 is the combustion chamber. Tube 39 is connected with casing 41 in such manner that the steam pressure acts on the lower side of the diaphragm 42. Movement of diaphragm 42 is transmitted through pin 43 to a lever 44. Pin 43 may be adjusted with respect to lever 44 by means of the nuts 45. A spring 46 acts against a sleeve 47 on pin 43 in opposition to the steam pressure acting on the lower side of diaphragm 42. The force of spring 46 may be adjusted by means of screw threaded member 55. Movement of lever 44 is transferred to lever 38 through a resilient mechanism including an adjustable screw 48 and a spring 49. Lever 38 has attached thereto an arm 50 which is connected by means of rod 51 and lever 52 to a diaphragm 53 on which air pressure acts through tube 54. Liquid discharged into relay housing 37, which is preferably at atmospheric pressure, leaves through conduit 56.

The operation of the regulator described is as follows:

Suppose the steam pressure in pipe 40 increases. This causes an increase of pressure on the lower side of diaphragm 42, moving the same upwardly against the action of spring 46, at the same time moving the right hand end of lever 44 upwardly and permitting the right hand end of lever 38 to move upwardly so that more liquid discharges from conduit 36. Due to the restricted passage 33, this causes a decrease of pressure in chamber 30 and spring 57 overcomes the pressure in chamber 30 and moves pilot valve 21 to the right whereby communication is established between conduits 20 and 24. By this communication pressure is released on the upper side of piston 18 and the servo-motor will cause the damper 12 to close more or less, the action including upward movement of piston 18 and piston rod 16 and downward movement of counterweight 17 and lever 13.

The amount of air passing to the furnace is thus diminished and consequently the pressure in duct 11 behind damper 12 at the point where tube 54 is connected diminishes. This reduction in air pressure is transmitted through tubing 54 and causes a movement of diaphragm 53 to the right due to the preponderance of force of spring 49 and rod 51 and the top of arm 50 are moved to the right causing lever 38 to move nearer to the opening from conduit 36 thus checking the effect of the increase of steam pressure which causes an upward movement of the right hand end of lever 38.

In converse manner, if the steam pressure in conduit 40 decreases, lever 38 checks the outflow from conduit 36 to a greater extent and pressure in chamber 30 is increased wherefor pilot valve 21 moves to the left and communication is established between conduits 23 and 20 so that piston 18 moves downwardly and the damper is opened. Increase of air pressure resulting acts through tube 54 to move diaphragm 53 to the left and causing lever 38 to move away from the liquid discharge opening thus checking the action sooner than if the change of air pressure should have to effect the generation of steam and the change in steam pressure returns the regulator to normal position.

The arrangement shown in Figs. 1 and 2 is particularly adaptable to use where the controlling impulse is a fluid of high pressure and the compensating impulse is of low pressure. The air pressure in duct 11 is usually so low that it is hard to get sufficient force for compensating against the force of the steam pressure, and if I did not have the resilient connection between the steam pressure operated mechanism and the air pressure operated mechanism it would take too large a diaphragm 54 and even with a large diaphragm the regulation would not be as sensitive as with the resilient arrangement shown. However, where the compensating fluid is at higher pressure the resilient mechanism may be omitted and the primary actuating pressure may act directly on lever 38. An embodiment adapted to such use is shown in Fig. 3. The part shown in Figure 3 takes the place of the parts 41 and 37 and associated parts as is clear from the drawing, like reference characters showing corresponding parts. In this case steam pressure acting on pin 58 causes movement of lever 38 in the same manner as in Fig. 1, and a corresponding change of liquid outflow takes place which controls that which is to be regulated, a change in which, transmitted through a mechanism similar to the air pressure operated mechanism of Fig. 1 returns the lever 38 nearer to or at its former position.

My invention is not limited to control of air to a furnace but may be used anywhere where one fluid regulates another. For example, one fluid may be the water supplied to wood grinders, in pulp mills, and the other fluid may be oil from a gear pump driven by a turbine driving the grinder. As a further example, the primary fluid may be gas in gas works in a gas exhauster line and the compensating fluid may be steam in the supply line to a turbine driving the exhauster.

I claim:

1. In combination, a first conduit through which a fluid flows, a second conduit through which a second fluid flows, fluid pressure operated means to control flow through the first conduit, a relay, means to discharge a restricted stream of fluid into said relay, means whereby changes in pressure in said stream cause operation of the fluid pressure operated means, a lever in the relay to control the discharge of said stream, means responsive to changes of pressure in said second conduit to move said lever and means responsive to pressure in the first conduit also acting on said lever to check the effect of the movement of the lever in response to changes of pressure in the second conduit.

2. A regulator comprising a relay, means to discharge a continuously flowing stream of fluid into said relay, a plurality of levers, resilient interconnecting means between said levers, one of said levers being arranged to control the discharge of said stream of fluid and means responsive to changes of pressure in different conduits acting upon said levers, one of the last mentioned means being arranged to check the operation of the other.

3. In combination, a first conduit through which a fluid flows, a second conduit through which a second fluid flows, fluid pressure operated means to control flow through the first conduit, a relay, means to discharge a restricted stream of fluid into said relay, means whereby changes in pressure in said stream cause operation of the fluid pressure operated means, a lever in the relay to control the discharge of said stream, means responsive to changes of pressure in said first conduit to move said lever, a second lever, a resilient interconnection between the levers and means responsive to pressure in the second conduit acting upon the second lever.

4. In combination, a first conduit through which a fluid flows, a second conduit through which a second fluid flows, fluid pressure operated means to control flow through the first conduit, a relay, means to discharge a restricted stream of fluid into said relay, means whereby changes in pressure in said stream cause operation of the fluid pressure operated means, a lever in the relay to control the discharge of said stream, a second lever, a resilient interconnection between said second lever and the first mentioned lever, means responsive to pressure in one of said conduits arranged to act on one of said levers and means responsive to pressure in the other of said conduits arranged to act on the other of said levers.

5. In combination, a first conduit through which a fluid flows, a second conduit through which a second fluid flows, fluid pressure operated means to control flow through the first conduit, a relay, means to discharge a restricted stream of fluid into said relay, means whereby changes in pressure in said means whereby changes in pressure in said stream cause operation of the fluid pressure operated means, a lever in the relay to control the discharge of said stream, and means responsive to changes of pressure in both said first conduit and said second conduit arranged to act on said lever.

6. In combination, a furnace, means to supply air to said furnace, fluid pressure operated means to control the supply of air, a relay, means to discharge a restricted stream of fluid into said relay, means whereby changes in pressure in said stream cause operation of the fluid pressure operated means, a lever to control said stream of fluid, means to move said lever in one direction upon increase of steam pressure and means to move said lever in opposed direction upon decrease of air pressure.

7. In combination, a furnace, means to supply air to said furnace, fluid pressure operated means to control the supply of air, a relay, means to discharge a restricted stream of fluid into said relay, a lever to control said stream of fluid and operating to change the pressure in said fluid and thus indirectly control the air supply means, point pivot mechanism for said lever, means movable in response to steam pressure acting on said lever and a compensating member movable in response to air pressure acting on said lever to check the action of the steam pressure responsive means.

8. In combination, a furnace, a duct to supply air to said furnace, a device to control passage of air through said duct, fluid pressure operated means to control said device, a relay to control said fluid pressure operated means, said relay comprising a housing, means to discharge a restricted stream of fluid into said housing, a lever controlling said stream of fluid, a second lever movable in response to changes in steam pressure, a spring between said levers and serving to transmit motion of one to the other, a member movable in response to air pressure acting on the first mentioned lever and means to transmit changes of air pressure from said duct to said member.

In testimony whereof I affix my signature.

STEN ERIC BERNHARD SÖDERBERG.